United States Patent [19]
Johnson et al.

[11] Patent Number: 5,567,480
[45] Date of Patent: Oct. 22, 1996

[54] COAL TAR ENAMEL COATED STEEL PIPE AND PROCESS FOR PRODUCING SAME

[75] Inventors: John R. Johnson, Danville; William R. Roder, Indianapolis; C. Sherill Henegar, Franklin, all of Ind.

[73] Assignee: Reilly Industries, Inc., Indianapolis, Ind.

[21] Appl. No.: 351,700

[22] Filed: Dec. 8, 1994

[51] Int. Cl.$^6$ .............................. B05D 3/02; B05D 1/36; B05D 1/02
[52] U.S. Cl. ..................... 427/410; 427/318; 427/422; 427/386
[58] Field of Search .................................. 427/410, 318, 427/302, 234, 239, 422, 386

[56] References Cited

U.S. PATENT DOCUMENTS

| | | | |
|---|---|---|---|
| 3,207,358 | 9/1965 | Fliss | 427/410 |
| 3,661,624 | 5/1972 | Versoy et al. | 427/195 |
| 4,213,486 | 7/1980 | Samour et al. | 138/143 |
| 4,421,569 | 12/1983 | Dichter et al. | 427/318 |
| 4,474,134 | 10/1984 | Snow | 427/233 |
| 4,997,685 | 3/1991 | Pieslak et al. | 427/407.1 |
| 5,026,451 | 6/1991 | Trzecieski et al. | 156/244.12 |

FOREIGN PATENT DOCUMENTS 60-97074  5/1985  Japan.

OTHER PUBLICATIONS

Chem. Abst. 112(20):184853r, Khaber, N. V. et. al, 1990 (no month available).
Chem. Abst. 105(22):192954v (No Date Avail).
Chem. Abst. 103(16):125102m, Kawasaki Steel Corp, May, 1985.
Chem. Abst. 93(18):169794t (No Date Avail).
Chem. Abst. 91(4):25193g (No Date Avail).
Chem. Abst. 86(4):20441y, Raymond R. Fessler et. al., No Date Avail).
Chem. Abst. 76(22):128944x (No Dates Avail) 1976.
Chem. Abst. 76(18):101307e (No Date Avail).
Chem. Abst. 73(16):78634m (No Date Avail).
Chem. Abst. 71(26):126096v (No Date Avail).
Chem. Abst. 71(22):103256h (No Date Avail).
DD-149789-A (Derwent Abstract) (No Date Avail).
J70011630-B (Derwent Abstract) (No Date Avail).
J69022753-B (Derwent Abstract) (No Date Avail).
Chem. Abst. 98:55643, R. S. Karimov et. al., 1982 (No Month Available).
Chem. Abst. 72:34552, Peter L. Critchell, 1969 (No Month Available).
Translation of Sho 45–11630 Apr. 27, 1970 Japan.

*Primary Examiner*—Diana Dudash
*Attorney, Agent, or Firm*—Woodard, Emhardt, Naughton, Moriarty & McNett

[57] ABSTRACT

Described is a method for manufacturing a coal tar enamel-coated steel pipe, in which a primer coat of epoxy resin is applied to a preheated steel pipe, and coal tar enamel is applied to the primer coat prior to full curing of the latter. The resulting coated steel pipes, which also are described, exhibit excellent resistance to cathodic disbondment, heat and water. In some embodiments the primer includes a silane coupling agent.

19 Claims, 1 Drawing Sheet

COAL TAR ENAMEL COATED STEEL PIPE AND PROCESS FOR PRODUCING SAME

BACKGROUND OF THE INVENTION

The present invention relates generally to forming coatings adhered to steel pipes to waterproof and protect the pipes against corrosion, and more particularly to an improved method for coating steel pipe with coal tar enamel, and to the products thereof.

As further background, steel pipe is commonly used to convey petroleum-based materials such as gas, oil and water. In service, of course, it is necessary that the steel pipe utilized be resistant to penetration by moisture which might facilitate corrosion of the steel and/or lead to contamination or loss of the material conveyed. For this reason, it is an adopted practice to coat steel pipe with a water-resistant bituminous material such as coal tar enamel. In this regard, coal tar enamel itself does not possess the properties necessary for sufficient direct bonding to steel pipe under relatively convenient processing conditions to meet the demands in industry. Therefore, a primer coat of chlorinated rubber has usually been applied to the steel pipe, followed by coating with the coal tar enamel to provide the overall waterproofed pipe.

In the steel pipe coating industry, waterproofing processes must desirably employ readily available and inexpensive materials which require as little handling as possible. In addition, processing steps should be convenient and processing time must be kept to a minimum. On the other hand, the resulting waterproof coating must survive a battery of tests in order to provide acceptable service. For example, industry has adopted several tests for the integrity of the coating including those for resistance to heat, cathodic disbondment, impact, and hot water.

In the face of these stringent economic and technical demands, there exists a need for improved methods for forming waterproof coatings on steel pipes, and improved products resultant of such methods. The instant invention addresses these needs.

SUMMARY OF THE INVENTION

It has been discovered that a highly serviceable waterproof coating can be formed on metallic pipes such as steel pipes utilizing a primer coating consisting essentially of an epoxy resin material and a top coating consisting essentially of a coal tar enamel. Such waterproof coatings and pipes having such coatings are readily and quickly manufactured while exhibiting excellent properties relative to resistance to cathodic disbondment, heat, water and the like. Accordingly, one preferred embodiment of the invention provides a method for forming a waterproofed steel surface on a steel pipe. The method includes the steps of preheating the steel surface, preferably to a temperature of at least about 55° C., and applying to the preheated steel surface a primer consisting essentially of a thermally-curable epoxy resin composition, wherein the resin begins to cure upon application to the steel surface. Prior to completion of curing of the epoxy resin, a preheated top coating composition consisting essentially of coal tar enamel at a temperature of at least about 200° C. is applied overtop the primer. Thereafter, the overall coating is caused to cure, and the materials are cooled to form the waterproofed steel surface.

Another preferred embodiment provides a waterproofed metallic pipe such as a steel pipe. The preferred pipe includes a steel pipe having a steel surface, and a waterproof coating on the steel surface. In this aspect of the invention, the waterproof coating includes a cured primer coating consisting essentially of epoxy resin bonded to the steel surface, and a top coating consisting essentially of coal tar enamel overtop and bonded to the primer coating.

Still another preferred embodiment of the invention relates to the discovery that a silane coupling agent can be used to improve the processing and adhesion characteristics of epoxy/coal tar enamel waterproofed coatings. Thus, this aspect of the invention provides a waterproofed steel pipe which includes a steel pipe having a steel surface and a waterproof coating on the steel surface. The waterproof coating includes a primer of a thermally-curable epoxy resin composition and a silane coupling agent bonded to the steel surface. A top coating consisting essentially of coal tar enamel is bonded overtop the primer coating.

The invention thus provides in its various embodiments improved products and methods relating to waterproofed steel pipe. The improved processes are very conveniently conducted, and provide quick cure times and thus high throughput in manufacturing operations. In addition, the resulting waterproof coatings exhibit excellent bonding properties and resistance to impact, cathodic disbondment, and water penetration. Additional objects, features and advantages of the invention will be apparent from the following description.

DESCRIPTION OF THE PREFERRED EMBODIMENT

Figure 1:
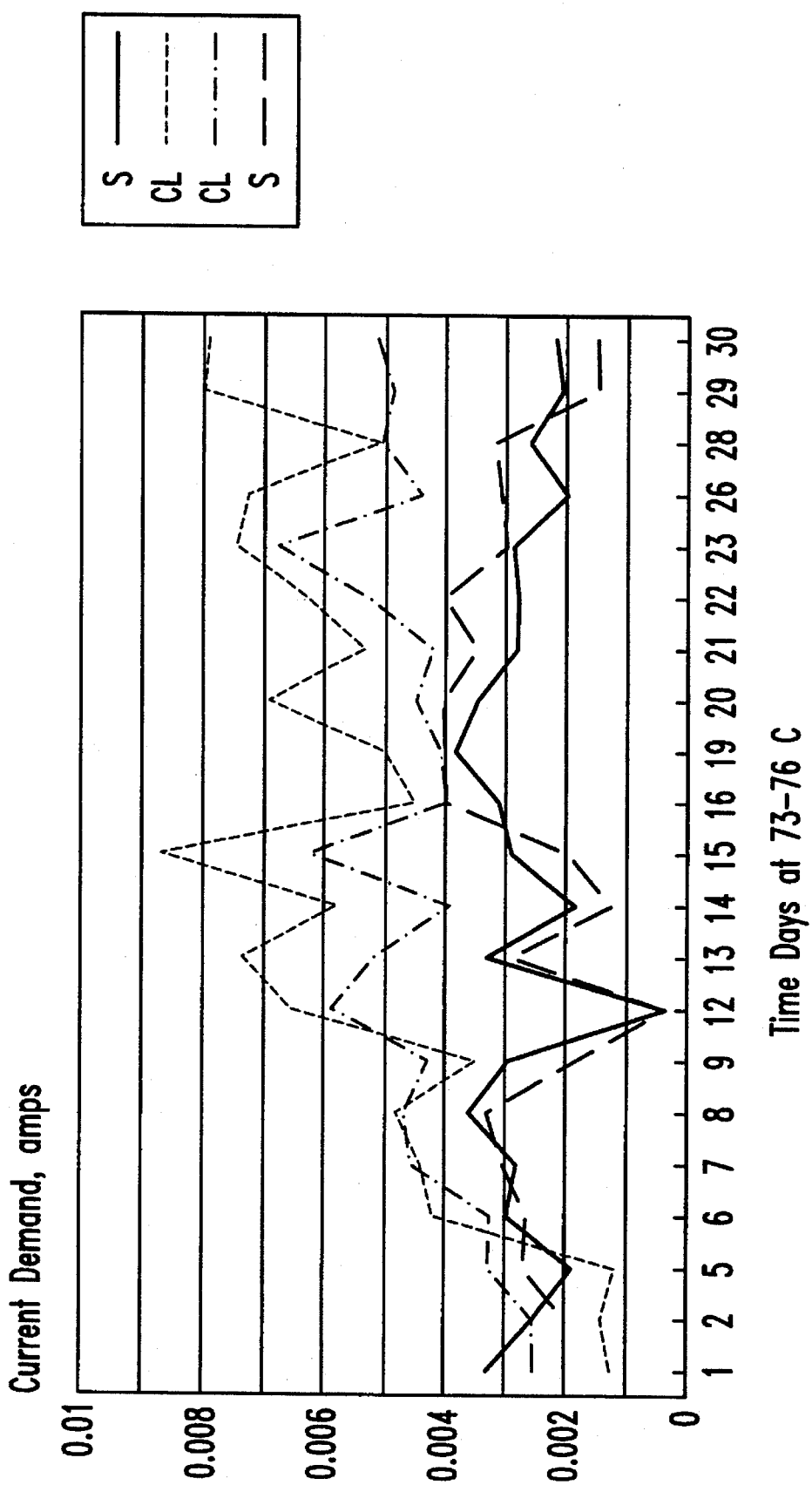
FIG. 1 shows electrical current demand over time for coatings of the invention versus a prior art coating.

For the purposes of promoting an understanding of the principles of the invention, reference will now be made to certain embodiments thereof and specific language will be used to describe the same. It will nevertheless be understood that no limitation of the scope of the invention is thereby intended, such alterations, further modifications, and applications of the principles of the invention as illustrated herein being contemplated as would normally occur to one skilled in the art to which the invention relates.

As discussed above, the present invention provides steel pipes waterproofed with a coating which includes essentially an epoxy primer and a coal tar enamel topcoat.

In this regard, the steel pipe utilized in the invention can be entirely conventional. In addition, in processing, the steel pipe can be advanced to a number of treatment stages to form the waterproof coating. For example, conventionally, the steel pipe is first preheated by a furnace, induction coil or the like in one stage of production, and then advanced into another stage wherein it is primed and then finally top coated in a still later stage. In accordance with the invention, the pipe is preferably preheated to a temperature of at least about 55° C., typically falling within the range of about 55° C. to about 150° C., and more typically in the range of about 55° C. to about 120° C. At temperatures below about 55° C., it has been found that inferior bonding of the overall waterproofed coating results. On the other hand, the utilization of preheating temperatures greater than 150° C. may be an inefficient use of energy. In addition to being preheated, of course, the steel surface of the pipe should be free from contaminants such as oils, dust or the like, which may interfere with the bonding of the primer coat.

After preheating, the pipe is next coated with the primer. Pursuant to the present invention the primer consists essentially of an epoxy resin composition which is thermally curable, i.e., one which forms a crosslinked, thermoset coating upon being subjected to heat. The preferred primer of the invention consisting essentially of the epoxy is free or essentially free from bituminous materials such as those which have been used in primer coats in the past. The preferred epoxy primer can, however, contain conventional fillers such as pigments and the like, without altering its susceptibility to spray application or its ability to form highly crosslinked matrices characteristic of epoxies. When used, fillers will typically be present in an amount of up to about 90 weight parts per 100 weight parts epoxy resin, usually in the range of about 15 to about 90 weight parts per 100 weight parts epoxy resin.

As to the particular epoxy compound utilized, this is not critical to the invention; however, it is preferred that the epoxy have an epoxy equivalent weight in the range of about 160 to about 700, more preferably about 225 to 300. For example, Bisphenol A-based epoxies and/or novalac polyfunctional epoxies can be employed. Derivatives of Bisphenol A are preferred, most preferably di-epoxides such as the diglycidyl ether of Bisphenol A. As usual, the epoxy compound is blended with an epoxy curing agent to form a thermally-curable epoxy resin composition. As curing agents and/or accelerators suitable for use in the invention, there may be mentioned phenol-novolac, cresole-novolac, and 3,3'-dially-4,4'-dihydroxybisphenol A; amine compounds such as 4,4'-methylenebis(2-ethylaniline), 4,4'-methylenebis(2-ethyl-6-methylaniline); diethylenetriamine; cycloaliphatic amines, e.g. N-aminomethylpiperazine, isophorone diamine (IPD) and bis-(p-aminocyclohexyl) methane; polyetheramines such as polyoxypropylenediamine; acid anhydrides such as Nadic methyl anhydride (methylbicyclo[2.2.1]heptene-2,3-dicarboxylic anhydride), phthalic anhydride, tetrahydrophthalic anhydride, methyltetrahydrophthalic anhydride, trimellitic anhydride, and pyromellitic anhydride; dicyandiamide; reaction products of dimerized fatty acids with a stoichiometric excess of diprimary polyamines or reaction products of epoxies with an excess of aliphatic amines; dihydrazide compounds such as adipic dihydrazine and isophthalic dihydrazide; and imidazoles such as 4-methylimidazole. Among these, polyamine curing agents have been found to provide particularly fast and effective cures in the present invention and are thus preferred.

The epoxy primers of the invention can be solventless or can contain a solvent if desired. Suitable solvents, when used, will include unreactive organic solvents such as aromatic solvents, e.g. benzene or alkylbenzenes such as toluene or xylene, or aliphatic solvents such as mono- or polyhydric alcohols, e.g. glycol solvents such as propyleneglycol which provide excellent solubility and allow the formation of higher solids coatings while also providing superior characteristics in environmental and safety concerns. The selection and utilization of such solvents for the epoxy primer compositions is well within the purview of those practiced in the area.

In another aspect of the invention, it has been discovered that a silane coupling agent can be incorporated into the primer to improve the bonding of the coating to the steel surface. In this regard, silane coupling agents are well known, and are generally of the formula $(F)_{4-n}Si(R)_n$, wherein n=1, 2 or 3 and F is a readily hydrolizable group such as a halogen (e.g. Br or Cl) or an alkoxy group, particularly $C_1-C_5$ alkoxies such as methoxy, ethoxy, propoxy and the like. R, on the other hand, is an organic group containing a function which is available to covalently bond with epoxy or other materials in the primer. This function, for example, can be an amino function, or a polymerizable function such as an epoxy, vinyl, or other polymerizable moiety. Preferred work to date has been conducted using an amino silane coupling agent encompassed by the formula $F_3SiR$ wherein R is an amino-substituted $C_1-C_{10}$ alkyl group, particularly for example a trimethoxy-gamma-aminopropyl silane coupling agent. The particular silane coupling agent employed in the invention is not critical, so long as it provides improved bonding to the steel surface. In practice, the silane coupling agent is preferably mixed with the primer coating prior to the application of the primer coating to the steel surface.

In preferred processes the epoxy primer is spray-applied to the exterior of the steel pipe to provide a cured thickness in the range of about 0.5 to about 5 mils, more typically in the range of about 1 to about 2 mils. Upon contact with the heated steel surface, the epoxy composition begins to cure. However, before curing is completed (i.e. while substantial unreacted polymerizable groups are left in the epoxy composition), a topcoating consisting essentially of a hot melt coal tar enamel is applied overtop the primer.

In this vein, coal tar enamels are well known and characterized in the coatings industry. Generally speaking, a coal tar enamel is prepared by plasticizing coal tar pitch, for example with coal and a coal tar oil, and also adding conventional fillers to the plasticized pitch such as talc, slate and/or mica cell. The resulting coal tar enamel softens upon heating and can be applied while heated. After cooling, the coal tar enamel forms a relatively hard, waterproof or water resistant coating.

Preferred coal tar enamels used in the present invention will have softening points in the range of about 90° C. to about 130° C. Softening points, when referred to herein, are as measured by the ring and ball method of ASTM D36. In addition, preferred coal tar enamels will have penetrations of about 0 to about 20 as measured by ASTM D5, modified per AWWA 203.

For application to the primed steel pipe, the coal tar enamel is preferably heated to a temperature of about 200° C. to about 300° C., more typically in the range of about 230° C. to about 280° C. At these temperatures, the coal tar enamel is a flowable material which can be poured over the primed steel pipe, for example while the latter is rotated, to provide a coal tar enamel coating overtop the primer. In typical applications, the coal tar enamel will be applied to provide a relatively thick coating, for example in the range of about 90 to about 160 mils. Coatings of such thickness provide serviceable coatings without the presence of polymerizable materials such as epoxies in the topcoat. The coal tar enamel coatings used in the invention also form a hardened coating relatively quickly, for example, usually within a period of twenty-four hours.

After the coal tar enamel is applied, continued heating can be applied to the steel or steel surface; however, in conventional operations there is sufficient residual heat in the steel pipe to complete the curing of the coating materials. Thus, in preferred processes, after application of the enamel the pipe is simply allowed to cool on its own or cooled using conventional techniques such as water spray. Also conventionally, after the application of the coal tar enamel and before it has hardened, the coated steel pipe can be reinforced with fiberglass and/or wrapped with kraft paper.

The resulting coatings have proven to be excellently serviceable. They have been substantially free of pinholes or other similar defects, and have exhibited excellent chemical and physical properties including resistance to cathodic disbondment, heat and hot water. The coated pipes of the invention are serviceable to temperatures generally higher than standard coated pipes which have chlorinated rubber primers and coal tar enamel topcoats. For example, the latter are generally understood to be serviceable only to about 65° C., whereas coated pipes of the invention are serviceable well above these temperatures, for example to temperatures of 80° C. and above and in testing to date even to temperatures of 120° C. and above.

For the purposes of providing a further understanding of the invention and its preferred features and advantages, the following specific examples are provided. It will be understood, however, that these examples are illustrative and not limiting of the invention.

EXAMPLE 1

A series of coatings, designated A through U, was prepared to illustrate the invention. The components of the coatings, and their relative amounts, are detailed in Table 1. The noted pigments were dispersed in epoxy resin using a Cowles type disperser at 8000 rpm on quart-size samples. The epoxy primer composition was applied to preheated, i.e., 43° to 100° C., sandblasted ½" steel substrate by spray application to a thickness of about 1 mil dry. Immediately after primer application, hot, liquid coal tar enamel (at a temperature of about 246° C.) was applied by pouring the enamel over the surface of the primed metal to a final thickness of 90 to 100 mils. After setting, the coated panels and a control panel ("CL", using chlorinated rubber primer) were then tested for adhesion using the modified ANSI/AWWAC203-91 test, and the results are shown in Table 2.

TABLE 1

| Component | A | B | C | D | E | F | G | H | I | J |
|---|---|---|---|---|---|---|---|---|---|---|
| Epon 874 CX90 | 40.27 | 39.94 | 39.82 | 39.82 | 36.72 | 36.72 | 36.72 | 36.72 | 61.35 | 61.35 |
| Magnesium Silicate | 26.46 | 26.25 | 26.17 | 26.17 | 24.13 | 24.13 | 24.13 | 24.13 | | |
| Red Iron Oxide | | | | | 4.27 | 4.27 | 4.27 | 4.27 | | |
| Carbon Black Paste | 2.88 | 2.86 | 2.85 | 2.85 | | | | | 4.40 | 4.40 |
| Medium Chrome Yellow | | | | | | | | | | |
| Xylene | 18.86 | 18.71 | 20.27 | 20.27 | 22.73 | 22.73 | 22.73 | 22.73 | 17.78 | 17.78 |
| Epicure 3282 | | | | | | | | | | |
| Epon Curing Agent U | 8.23 | 8.17 | | | 7.51 | 7.51 | | | 12.29 | 12.29 |
| Ethyl Alcohol | 3.30 | 3.27 | | | 3.01 | 3.01 | | | 4.91 | 4.91 |
| Jeffamine D230 | | | 9.91 | 9.91 | | | 9.14 | 9.14 | | |
| Accelerator 399 | | | 0.97 | 0.97 | | | 0.93 | 0.90 | | |
| Amino Silane | | 0.400 | | 0.47 | | 0.82 | | 0.82 | | 1.35 |
| N-Butanol | | 0.400 | | 0.46 | | 0.82 | | 0.82 | | 1.35 |
| Glycol Ether PM | | | | | | | | | | |

| Component | K | L | M | N | O | P | Q | R | S | T | U |
|---|---|---|---|---|---|---|---|---|---|---|---|
| Epon 874 CX90 | 61.35 | 61.35 | 36.34 | 36.34 | 36.34 | 36.34 | 33.27 | 33.27 | 16.22 | 16.09 | 55.7 |
| Magnesium Silicate | | | 23.88 | 23.88 | 23.88 | 23.88 | 21.88 | 21.88 | 10.66 | 10.58 | |
| Red Iron Oxide | | 4.22 | 4.22 | 4.22 | 4.22 | 3.8 | 3.8 | 1.89 | 1.87 | 6.4 | |
| Carbon Black Paste | 4.40 | 4.40 | 2.59 | 2.59 | 2.59 | 2.59 | 2.39 | 2.39 | 1.16 | 1.15 | 4.0 |
| Medium Chrome Yellow | | | | | | | 6.10 | 6.10 | | | |
| Xylene | 17.78 | 17.78 | 22.48 | 22.48 | 22.48 | 22.48 | 20.59 | 20.59 | 67.39 | 66.86 | |
| Epicure 3282 | | | | | | | | | 2.68 | 2.65 | 9.2 |
| Epon Curing Agent U | | | 7.49 | 7.49 | | | 7.37 | | | | |
| Ethyl Alcohol | | | 2.99 | 2.99 | | | 2.95 | | | | |
| Jeffamine D230 | 14.99 | 14.99 | | | 9.13 | 9.13 | | 8.99 | | | |
| Accelerator 399 | 1.47 | 1.47 | | | 0.89 | 0.89 | | 0.88 | | | |
| Amino Silane | | 1.35 | | 0.83 | | 0.88 | 0.81 | 0.81 | | 0.8 | 1.4 |
| N-Butanol | | 1.35 | | 0.83 | | 0.88 | 0.81 | 0.81 | | | |
| Glycol Ether PM | | | | | | | | | | | 23.3 |

TABLE 2

| Test | CL | A | B | C | D | E | F | G | H | I | J | K | L | M | N | O | P | Q | R | S | T | U |
|---|---|---|---|---|---|---|---|---|---|---|---|---|---|---|---|---|---|---|---|---|---|---|
| 72 Hr. Oven Peel Adhesion (38° C.) | | | | | | | | | | | | | | P | P | P | P | | | | | |
| 72 Hr. Oven Peel Adhesion (110° C.) | P | P | P | P/W | P | P/W | P/W | P | P | P/W | P | P | P | P | P/W | P | P | P | P | P | P | P |
| 2 Hr. Oven Peel Adhesion (127° C.) | | | | | | | | | | | | | | P | P | P | P/W | P | P | P | P | P |
| Water Immersion Peel (27° C.) | | | | | | | | | | | | | | P | P | P | P | | | | | |
| Water Immersion Peel (38° C.) | | | | | | | | | | | | | | P | P | P | P | | | | | |
| Water Immersion Peel (60° C.) | | | | | | | | | | | | | | P | P | P | P | | | | | |
| Water Immersion Peel (71° C.) | F | P | P | F | P | P | P | P | F | F | F | P | P | F | P | P | P | P | P | P | P | P |
| Water Immersion Peel (82° C.) | P | P | P | P | P | P | P | F | F | F | F | P | F | P | P | P | P | P | P | P | P | P |

TABLE 2-continued

| Test | CL | A | B | C | D | E | F | G | H | I | J | K | L | M | N | O | P | Q | R | S | T | U |
|---|---|---|---|---|---|---|---|---|---|---|---|---|---|---|---|---|---|---|---|---|---|---|
| Water Immersion Peel (97° C.) | P | P | P | F | P | P | P | P | P | P | P | P | P | P | P | P | P | P | P | P | P | P |

The results demonstrate that excellent, heat and water resistant coatings were formed using the epoxy primer/coal tar enamel system of the invention. Variation in both type and amount of pigment did not significantly impact the adhesion of the primer to the steel surface. In most cases testing demonstrated that water resistant coatings were formed which withstood both hot oven and water immersion testing to temperatures near or in excess of 100° C. In analogous testing, several different coal tar enamels ranging in penetration from 2–20 and in softening points from 100° C. to 127° C. performed similarly.

EXAMPLE 2

Cathodic bonding tests (ASTM G42–90) were performed on coated steel pipe using the formulation S primer (Table 1) and a standard chlorinated rubber primer. The tests utilized a 2 and ⅜-inch O.D. steel pipe preheated to 72° C., with primer and then immediate coal tar enamel application as in Example 1, followed by a 48 hour 25° C. post cure. The results, shown in Table 3 and FIG. 1, show that epoxy primer formulation S provides highly improved cathodic disbondment resistance relative to the chlorinated rubber primer "CL" after 30 days of testing at 74° C. Electrical current demand measurements (see FIG. 1) are in agreement with these findings. Measurements were made daily over a 30-day period in accordance with the ASTM G42-90 test method. These results demonstrate the increasing trend of current demand with the chlorinated rubber primer, as compared to a flat demand with epoxy primer formulation S.

TABLE 3

| Primer Formulation | S | CL |
|---|---|---|
| Cathodic Disbondment (mm) | 9.1 | NA* |
| Area Disbonded (mm²) | 398 | 11200 |
| % Of Coating Disbonded | 0.61 | 21 |

*Too large and numerous to quantify.

EXAMPLE 3

A series of runs was conducted utilizing a silane coupling agent in the coating. The silane was added to the primer immediately before spraying to evaluate short term cure adhesion performance at different steel panel temperatures. The results, shown in Table 4, demonstrate the effect of the silane coupling agent on adhesion performance, using the ANSI/AWWAC203-91 test method. The steel panels were preheated to between 43° C. and 100° C. and primed, as in the above procedures. Adhesion was tested at an initial time of 4 hours to demonstrate the lower time and temperature limits for full performance. With the additive, see formulation T, full adhesion was developed in only 5 hours, after a 60° C./30 min. cure as compared to a failure at this time without the additive, under the same conditions. The silane coupling agent thus increased the rate of cure of the epoxy/coal tar enamel coating.

TABLE 4

| Temperature (°C.) | Time (hrs.) | S | T |
|---|---|---|---|
| 43 | 5 | F | F |
| 51 | 5 | F | F |
| 60 | 5 | F | P |
| 73 | 5 | P | P |
| 100 | 1 | F | P |

EXAMPLE 4

A series of experiments was conducted to evaluate various epoxy curing agents in the invention. A number of polyamide curing agents were tried, including Ancamide 400 (Air Products) and Epicure 3140 (Shell Chemical). The rate of cure at 72° C. was low with the polyamides even with the use of a tertiary amine cure accelerator. Polyamine and epoxyamine adduct curing agents were also tested. The primer formulations tested are given in Table 5, and the results with 4 mil. wet drawn down coatings on cold rolled steel, with a 5 minute solvent flash are shown in Table 6. The results demonstrate the relatively fast, effective cures obtained using Epicure 3282 (Shell Chemical, epoxy-amine adduct) and Jeffamine D230 (a polyoxypropylenediamine).

TABLE 5

| Component | I | II | III | IV | V |
|---|---|---|---|---|---|
| Epon 874-CX90 | 60.83 | 60.37 | 59.94 | 57.34 | 57.17 |
| Epicure 3282 | | | | | 11.49 |
| Jeffamine D230 | 14.84 | 14.75 | 14.62 | 13.99 | |
| Accelerator 399 | | 0.75 | 1.46 | | |
| DMP-30 | | | | 5.73 | |
| XYLENE | 24.33 | 24.15 | 23.98 | 22.94 | 24.18 |
| Carbon Black Dispersion | | | | | 7.16 |
| TOTAL | 100 | 100 | 100 | 100 | 100 |

TABLE 6

| Formulation | 30' @ 47° C. | 30' @ 67° C. | 30' @ 72° C. |
|---|---|---|---|
| I | No Cure | No Cure | No Cure |
| II | No Cure | No Cure | No Cure |
| III | No Cure | No Cure | Print Free, 200 PSI |
| IV | No Cure | Print Free, 188 PSI | Print Free |
| V | Print Free | Print Free, 200 PSI | Print Free |

While the invention has been described in some detail in the foregoing passages, it will be understood that the discussions herein are illustrative of the invention and that alterations, modifications or additions can be made to the described procedures without departing from the spirit and scope of the applicant's invention.

What is claimed is:

1. A method of forming a waterproofed steel surface on a steel pipe, comprising:

preheating the steel surface to a temperature of at least about 55° C.;

applying a primer consisting essentially of a thermally-curable epoxy resin composition to the preheated steel surface, wherein the epoxy resin composition begins to cure upon application to the steel surface;

prior to completion of curing of said epoxy resin composition, applying a preheated top coating consisting essentially of coal tar enamel at a temperature of at least about 200° C. overtop said primer, said coal tar enamel having a softening point in the range of about 90° C. to about 130° C.; and cooling said steel surface, primer and top coating to form said waterproofed steel surface.

2. The method of claim 1 wherein said epoxy resin composition is a liquid, and said applying includes spraying said epoxy resin composition on the preheated steel surface.

3. The method of claim 1 wherein the steel surface is preheated to a temperature in the range of about 55° C. to about 150° C.

4. The method of claim 3 wherein the top coating is at a temperature in the range of about 200° C. to about 300° C. when applied overtop the primer.

5. The method of claim 4 wherein said thermally-curable epoxy resin composition has a curing agent selected from the group consisting of polyamide, polyamine and epoxyamine adduct curing agents.

6. The method of claim 5 wherein said primer is applied in sufficient amount to provide a cured film thickness of about 0.5 to 5 mils.

7. The method of claim 6 wherein said primer is applied in sufficient amount to provide a cured film thickness of about 1 to 2 mils.

8. The method of claim 6 wherein said epoxy resin is a bisphenol A resin, a multifunctional epoxy novalac resin, or a blend thereof.

9. The method of claim 6 wherein said epoxy resin is a diglycidyl ether of bisphenol A.

10. The method of claim 6 wherein the thermally-curable epoxy resin composition has a curing agent which is a polyamine.

11. The method of claim 9 wherein the thermally-curable epoxy resin composition has a curing agent which is a polyamine.

12. The method of claim 3 wherein the steel surface is preheated to a temperature in the range of 55° C. to 120° C.

13. A method of forming a waterproofed steel surface on a steel pipe, comprising:

preheating the steel surface to a temperature of about 55° C. to about 150° C.;

spray applying a liquid primer consisting essentially of a liquid, thermally-curable epoxy resin composition to the preheated steel surface, wherein the epoxy resin composition begins to cure upon application to the steel surface;

prior to completion of curing of the epoxy resin composition, applying a preheated coal tar enamel at a temperature of at least about 200° C. overtop said primer; and cooling said steel surface, primer coating and coal tar enamel to form said waterproofed steel surface.

14. The method of claim 13, wherein:

said steel surface is preheated to a temperature of about 55° C. to about 120° C.

15. The method of claim 14 wherein:

said coal tar enamel has a softening point in the range of about 90° C. to about 130° C.

16. A method of forming a waterproofed steel surface on a steel pipe, comprising:

preheating the steel surface to a temperature of at least about 55° C.;

applying a primer comprising a thermally-curable epoxy resin composition with a silane coupling agent to the preheated steel surface, wherein the epoxy resin composition begins to cure upon application to the steel surface;

prior to completion of curing of said epoxy resin composition, applying a preheated top coating comprising coal tar enamel at a temperature of at least about 200° C. overtop said primer; and cooling said steel surface, primer and top coating to form said waterproofed steel surface.

17. The method of claim 16 wherein:

the silane coupling agent is an aminosilane coupling agent.

18. The method of claim 17 wherein:

the silane coupling agent is a triethoxy- or trimethoxyaminosilane.

19. The method of claim 16 wherein said thermally curable epoxy resin composition has a curing agent which is a bisphenol A-amine adduct or polyoxypropyenediamine.

* * * * *

UNITED STATES PATENT AND TRADEMARK OFFICE
CERTIFICATE OF CORRECTION

PATENT NO. : 5,567,480
DATED : October 22, 1996
INVENTOR(S) : John R. Johnson et al.

It is certified that error appears in the above-indentified patent and that said Letters Patent is hereby corrected as shown below:

col. 3, line 29, please delete "dially" and insert in lieu thereof --diallyl--.

In Table I under columns 5 and 6, please shift the second row of results for Red Iron Oxide so that instead of starting from column L and reading through column T, that row will start under column M and read through column U.

Signed and Sealed this

Thirteenth Day of January, 1998

Attest:

BRUCE LEHMAN

Attesting Officer

Commissioner of Patents and Trademarks